D. Schuyler,
Organ Bellows.
Nº 56,106. Patented July 3, 1866.
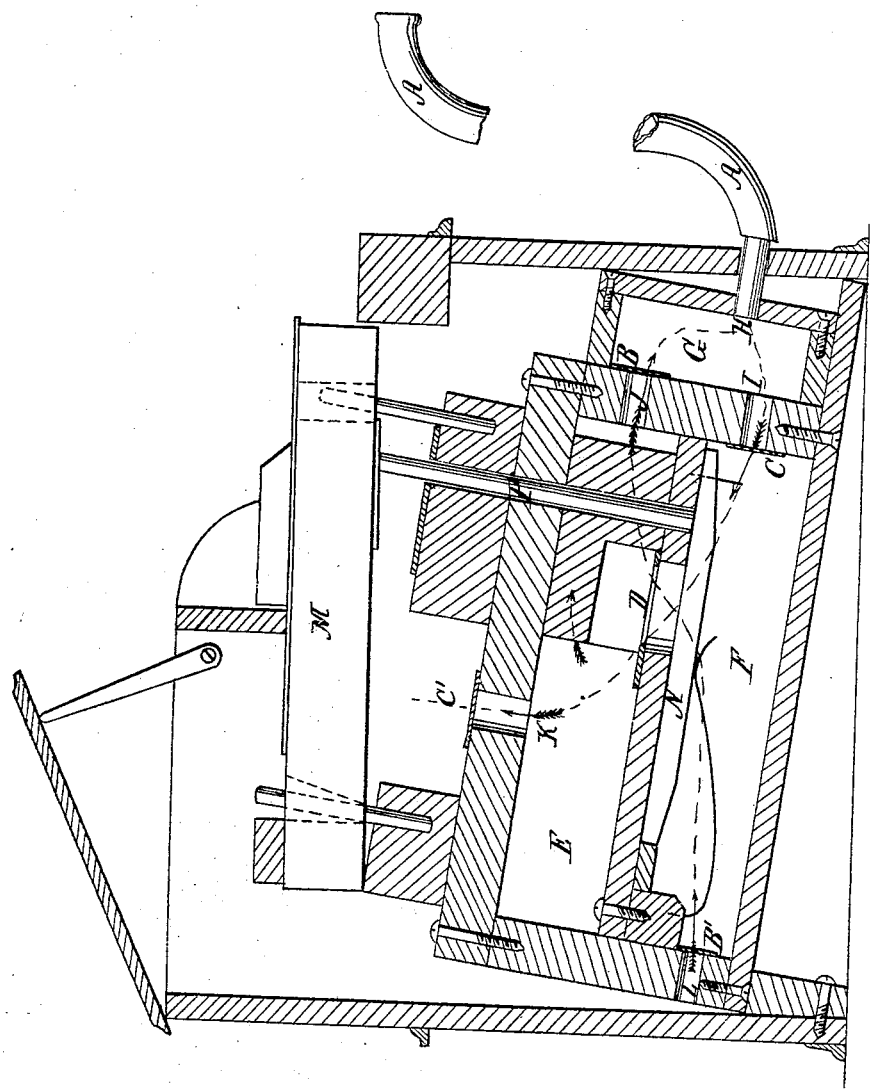
Daniel Schuyler

UNITED STATES PATENT OFFICE.

DANIEL SCHUYLER, OF BUFFALO, NEW YORK.

IMPROVEMENT IN MUSICAL INSTRUMENTS.

Specification forming part of Letters Patent No. 56,106, dated July 3, 1866.

*To all whom it may concern:*

Be it known that I, DANIEL SCHUYLER, of the city of Buffalo, county of Erie, and State of New York, have invented a new and valuable Musical Instrument; and I do hereby declare that the following is a full and exact description thereof, reference being had to the annexed drawing, making a part of this specification.

My invention consists in making a reed instrument with the regular melodeon-action key-board, &c., with the ordinary bellows for supplying wind omitted, and a pipe or tube attached, through which the performer can breathe, the instrument being so constructed that blowing the air out or drawing it back through the tube will cause it to pass in one and the same direction through the reeds, thus enabling the performer to keep up a constant supply of wind by the simple and natural process of breathing.

To enable others skilled in the art to make and use my invention, I will proceed to describe its construction and operation.

I provide a key, M, push-down pin P, and valve N, the same as ordinarily used in melodeons, and in addition to these I provide three air-chambers, E F G, with apertures H I J K L, also valves B B' C C' and a tube, A.

The manner of using the instrument is as follows: The performer, by pressing down the key M, opens the valve N; then by blowing through the tube A valves B and B' are closed and valves C and C' are opened, and the wind passes from the air-chamber F up through the reed D into air-chamber E, and out through aperture K, causing the reed D to sound. By drawing the air back through the tube A by suction or inhalation, valves C and C' are closed and valves B and B' are opened, and the wind passes through aperture L into air-chamber F, then up through reed D into air-chamber E, then through aperture J into air-chamber G and tube A, causing the reed D to sound. Any desired number of octaves can be used in this kind of an instrument.

If desired, instead of supplying the wind by inhaling and exhaling through the pipe A, a bellows having no outside opening or valve can be placed over the aperture H in air-chamber G, so that by drawing or closing the bellows the air will in both cases pass through the reeds in one direction.

The instrument partakes of the nature of the melodeon and mouth-organ, but differs essentially from either. It is similar to the melodeon in its construction, but has three air-chambers and the melodeon but one, and the ordinary bellows are not used. It differs from the mouth-organ in its construction and operation, the mouth-organ being supplied with wind from the same source, but having no key-board, valves, &c.

The performer, by supplying the wind by inhaling and exhaling through the pipe, can have superior control over the quality and quantity of tone, and can produce effects not obtainable with ordinary bellows instruments.

I claim—

A combination of valves and air-chambers, so constructed and arranged that by blowing the wind through the air-chambers or drawing the wind back and out of the air-chambers the wind will in both cases pass through the reeds in one and the same direction, substantially for the purpose set forth.

DANIEL SCHUYLER.

Witnesses:
W. G. OATMAN,
H. CHANDLER.